United States Patent [19]
Bell et al.

[11] Patent Number: 5,271,049
[45] Date of Patent: Dec. 14, 1993

[54] GRID KEY FOR INTERIOR GRID CELLS

[75] Inventors: Douglas W. Bell; Jeffrey S. Whitt, both of Lynchburg, Va.

[73] Assignee: B&W Fuel Company, Lynchburg, Va.

[21] Appl. No.: 965,322

[22] Filed: Oct. 23, 1992

[51] Int. Cl.$^5$ .................................................. G21C 21/00
[52] U.S. Cl. ........................................ 376/261; 376/438
[58] Field of Search ............... 376/438, 261, 441, 446; 29/723

[56] References Cited

U.S. PATENT DOCUMENTS

| | | | |
|---|---|---|---|
| 3,933,583 | 1/1976 | Jabsen | 376/438 |
| 4,651,403 | 3/1987 | DeMario et al. | 29/723 |
| 4,859,407 | 8/1989 | Nylund | 376/446 |
| 5,061,437 | 10/1991 | Whitt | 376/438 |
| 5,068,081 | 11/1991 | Oyama et al. | 376/261 |
| 5,124,116 | 6/1992 | Whitt | 376/438 |

Primary Examiner—Donald P. Walsh
Assistant Examiner—Frederick H. Voss
Attorney, Agent, or Firm—Robert J. Edwards; D. Neil LaHaye

[57] ABSTRACT

A grid key for interior grid cells. A rectangular main body portion is bent near the middle at approximately a 90 degree angle. Two tabs that are flush with the main body portion extend outward in opposite directions from one end and along a portion of the length of the main body portion. The opposing side of the tabs is tapered at a 45 degree angle back toward the main body portion. The main body portion has a thickened section that coincides with the tabs. The thickened section is wedged between the soft stops of an individual interior grid cell to retract the stops and allow loading of a fuel rod.

4 Claims, 3 Drawing Sheets

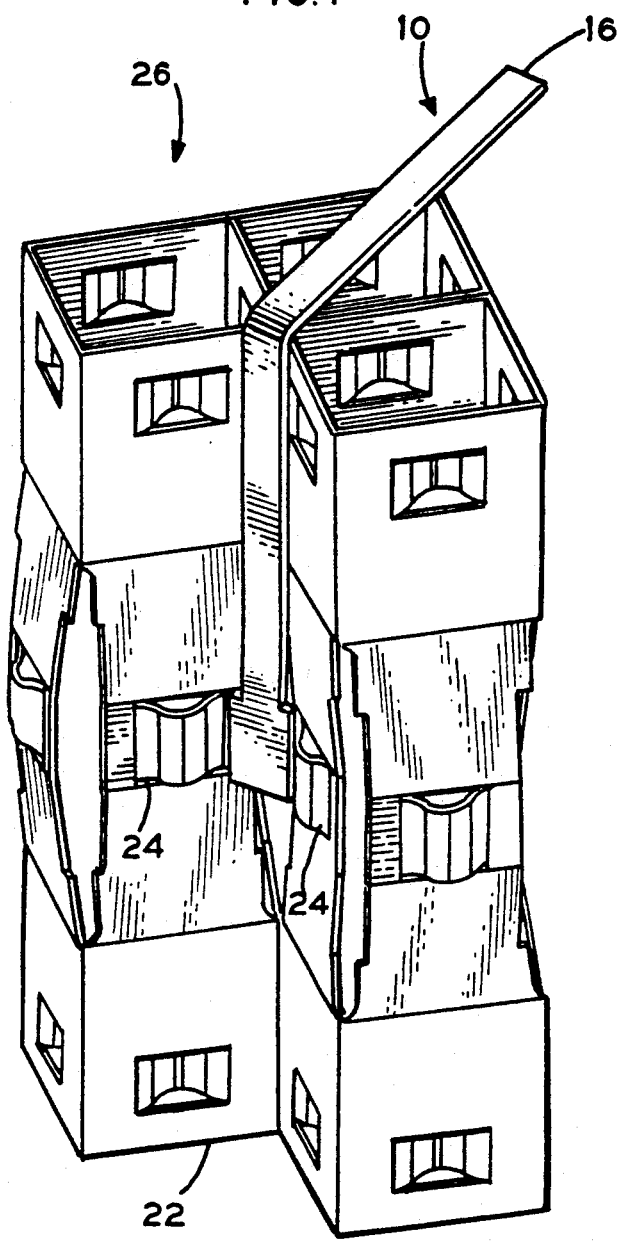

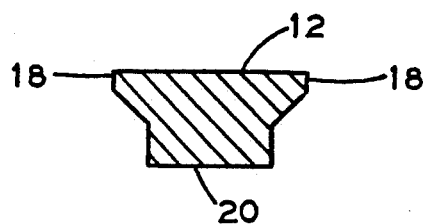
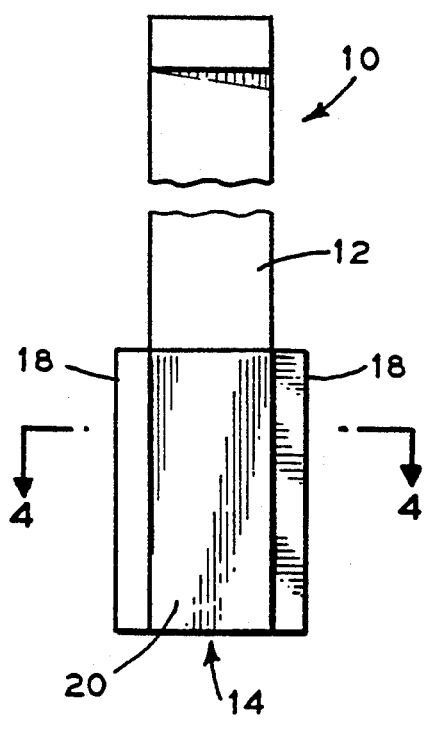
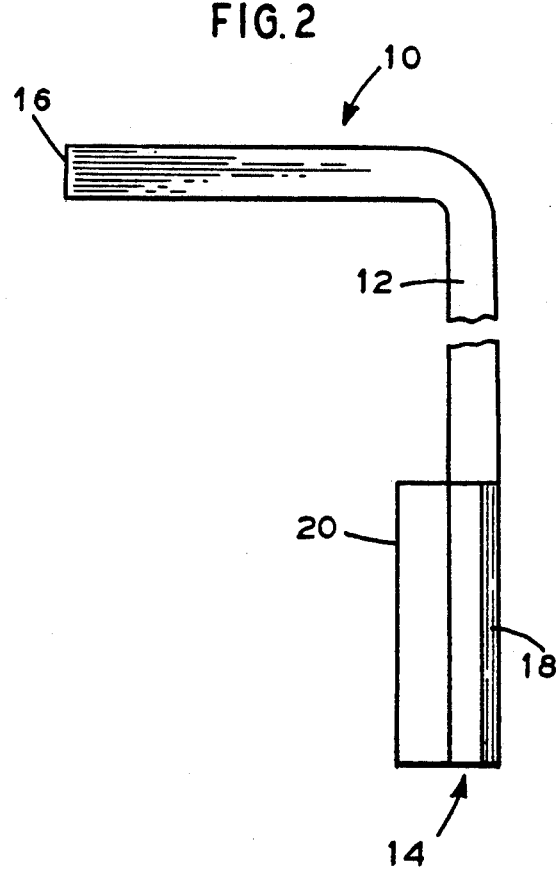

GRID KEY FOR INTERIOR GRID CELLS

BACKGROUND OF THE INVENTION

1. Field of the Invention

The present invention is generally related to nuclear fuel assemblies and, in particular to an apparatus and method for loading fuel rods into interior grid cells of the fuel assembly.

2. General Background

Grids used in commercial nuclear fuel assemblies are fabricated with stops that grip the fuel rods in place when the fuel assembly is in the as-built condition. The stops on two adjacent cell walls are hard stops, with a fixed location, and the other two cell walls have spring loaded soft stops. During fuel assembly fabrication it is desirable to have the soft stops withdrawn away from the centerline of each grid cell to allow free passage of the fuel rod into and through the grid. Keying of the stops to cause them to withdraw from the centerline of their grids is typically performed using a rectangular wire that is inserted into and through the windows of the grid. The wire key extends through the full width of the grid and is rotated so that the thickest cross section of the key wedges the strip section backward and thus withdraws the stop. The key is machined with cutouts to preclude interference with the fuel rods when in the rotated position. Several interior grid cells, however, can not be keyed using the rectangular keys. This is due to interference with previously installed guide thimbles. Guide thimbles that have ferrules attached to restrain the grid must be installed prior to insertion of the fuel rods. The guide thimbles have a larger diameter than the fuel rods and the rectangular keys do not have clearance to get past the thimbles. As a result, several fuel rods must be installed into unkeyed grid cells. A lubricant is used to minimize damage to the fuel rods, but the lubricant is difficult to remove from the fuel rods after assembly.

Patents directed to keying of grid cells that applicants are aware of include the following.

U.S. Pat. No. 3,933,583 discloses rectangular wire keys used for deflecting stops in the grid.

U.S. Pat. No. 4,651,403 discloses a pair of comb devices that are utilized to depress springs within the grid cells for loading of fuel rods.

U.S. Pat. No. 5,068,081 discloses the consecutive use of two separate members in the grid wherein the first member is removed after the second member is inserted and the fuel rods are then loaded into the grid.

U.S. Pat. No. 5,124,116 discloses a grid key for keying exterior grid cells only.

The known art does not address the need for a grid key that may be used on interior grid cells when the soft stops can not be retracted from the adjacent cell due to interference from associated equipment such as a guide thimble.

SUMMARY OF THE INVENTION

The present invention addresses the above problem in a straightforward manner. What is provided is a grid key for keying individual interior grid cells. A main body portion is bent at approximately a 90 degree angle near its middle. One end of the main body portion is provided with two tabs that each extend outward in opposite directions along a portion of the length of the main body portion. The tabs are flush with one side of the main body portion and taper inwardly at approximately a 45 degree angle toward the rear of the main body portion on another side. Keying of the grid is accomplished by inserting the end with the tabs into the corner of the cell so that the portion of the key beyond the 90 degree bend above the cell extends away from the cell at a 45 degree angle. An installation tool is used to push the tab end of the key between the soft stops in the corner and wedge it into place. This retracts the soft stops. The fuel rod may then be loaded and the key removed afterward.

BRIEF DESCRIPTION OF THE DRAWINGS

For a further understanding of the nature and objects of the present invention reference should be had to the following description, taken in conjunction with the accompanying drawings in which like parts are given like reference numerals, and wherein:

FIG. 1 is a partial cutaway view of a grid assembly that illustrates the invention in position in the grid assembly.

FIG. 2 is a side view of the invention.

FIG. 3 is a view rotated 90 degrees to that of FIG. 2

FIG. 4 is a view taken along the lines 4—4 of FIG. 3.

DETAILED DESCRIPTION OF THE PREFERRED EMBODIMENT

Figure 5:
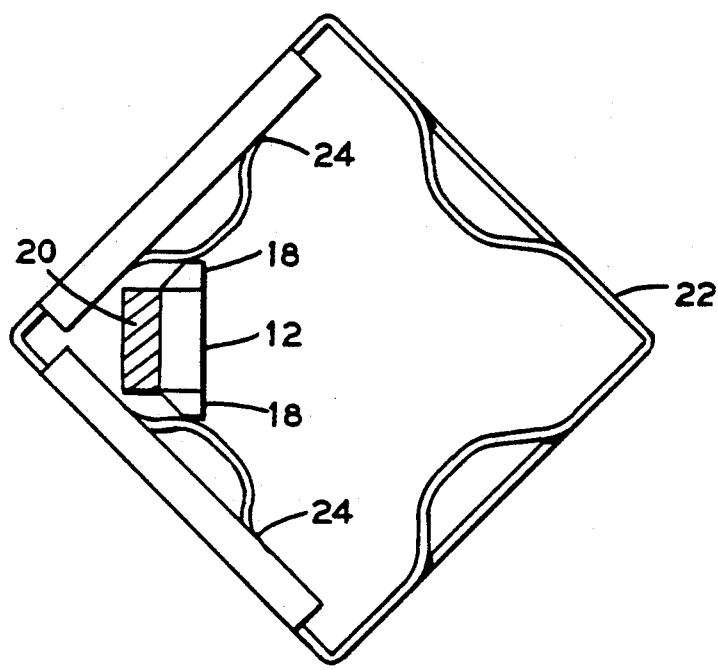
FIG. 5 is a top view that illustrates the invention when it is first inserted into the grid cell.

Referring to the drawings, it is seen in FIG. 1-3 that the invention is generally indicated by the numeral 10. Grid key 10 is formed in the shape of a rectangular bar to provide a main body portion 12 having first and second ends 14, 16. Main body portion 12 is bent near the middle to form an approximate 90 degree angle in main body portion 12.

First end 14 is provided with two wings or tabs 18. In the preferred embodiment tabs 18 are integral with main body portion 12 for ease of fabrication and strength. The following terms will be used for the sake of clarity in referring to the various dimensions of main body portion 12 and tabs 18. The dimension of main body portion 12 between first and second ends 14, 16 shall be indicated as the length of main body portion 12. The dimension of tabs 18 from first end 14 back toward the bend in main body portion 12 shall be indicated as the length of tabs 18. The dimension across both tabs 18 shall be indicated as the width across tabs 18 with the corresponding dimension across main body portion 12 being indicated as the width of main body portion 12. The thickness of tabs 18 and main body portion 12 is that dimension perpendicular to the width. Solid lines are used in FIG. 2,3,5, and 6 to clearly distinguish between main body portion 12, tabs 18, and thickened section 20 of main body portion 12.

As best seen in FIG. 2–4, tabs 18 extend outward in opposite directions from the width of first end 14 and along a portion of the length of main body portion 12. Although the length of tabs 18 will depend on the type of grid to be keyed, the length of tabs 18 in the preferred embodiment is 0.400 inch +/−0.010 inch when used for zircaloy or inconel grids. As best seen in FIG. 4, one side of tabs 18 is flush with main body portion 12 while the opposing side of tabs 18 tapers inwardly toward main body portion 12 at approximately a 45 degree angle. It is also seen in FIG. 2 and 4 that main body portion 12 is provided with thickened section 20 that is thicker than the remainder of main body portion 12 and has a length equal to that of tabs 18.

Figure 6:
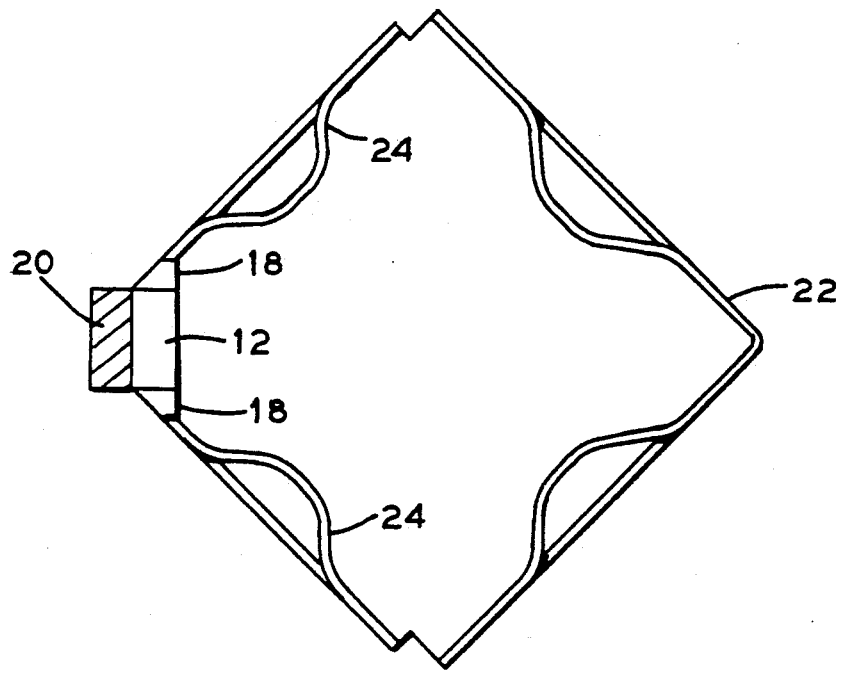
FIG. 6 is a top view that illustrates the invention in its operative position in the grid cell.

During loading of fuel rods into the interior grid cells of the fuel assembly, grid key 10 is used in the following manner. Grid key 10 is positioned in interior grid cell 22 as seen in FIG. 5 so that first end 14 is adjacent soft stops 24. A separate tool is then used to press thickened section 20 against soft stops 24 as seen in FIG. 1 and 6 and wedge first end 14 in place. Tabs 18 restrict the installation depth of thickened section 20. FIG. 1 is a cutaway view of a grid assembly 26 that illustrates grid key 10 when in its operative position. Second end 16 is above grid assembly 26 and extends away from cell 22 being keyed at approximately a 45 degree angle. After a fuel rod is loaded into cell 22, grid key 10 is removed by using second end 16 as a lever to twist or pivot thickened section 20 out of its wedge position between soft stops 24.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A grid key for keying individual interior grid cells in a nuclear fuel assembly, comprising:
   a. a main body portion having first and second ends, said main body portion being bent at approximately a 90 degree angle near the middle of said main body portion;
   b. two tabs that extend outward in opposite directions from said first end along a portion of said main body portion; and
   c. said tabs each having one side flush with said main body portion and the opposing side tapering inwardly toward said main body portion.

2. The grid key of claim 1, wherein said main body portion is provided with a thickened section that extends from the first end toward the second end of said main body portion and is equal to the length of said tabs.

3. The grid key of claim 1, wherein the tapering side of said tabs is at an approximate 45 degree angle to said main body portion.

4. A grid key for keying individual interior grid cells, comprising:
   a. a main body portion having first and second ends, said main body portion being bent at approximately a 90 degree angle near the middle of said main body portion;
   b. two tabs that extend outward in opposite directions from said first end along a portion of said main body portion;
   c. said tabs each having one side flush with said main body portion and the opposing side tapering inwardly toward said main body portion at approximately a 45 degree angle; and
   d. said main body portion having a thickened section that extends from the first end toward the second end of said main body and is equal to the length of said tabs along said main body portion.

* * * * *